May 14, 1946.　　　C. TALLION　　　2,400,319
SPRING ASSEMBLY MACHINE
Filed Oct. 19, 1944　　　2 Sheets-Sheet 1

INVENTOR.
CHARLES TALLION
BY
Joseph F. Teagno

May 14, 1946.  C. TALLION  2,400,319

SPRING ASSEMBLY MACHINE

Filed Oct. 19, 1944  2 Sheets-Sheet 2

INVENTOR.
CHARLES TALLION
BY

Patented May 14, 1946

2,400,319

UNITED STATES PATENT OFFICE 2,400,319

SPRING ASSEMBLY MACHINE

Charles Tallion, Detroit, Mich., assignor to Eaton Manufacturing Company, Cleveland, Ohio, a corporation of Ohio Application October 19, 1944, Serial No. 559,468

13 Claims. (Cl. 140—71)

This invention relates to contractile or garter springs and more particularly to mechanism for the assembly thereof.

Broadly, the invention comprehends a machine for automatically assembling garter springs, that is the joining or screwing together of the respective ends of an extension spring to thus form a circular unit.

Heretofore the assembly of contractile or garter springs has been done wholly by hand with the result that the speed of assembly has been limited to human skill and endurance. This method of assembly has existed since the inception of the manufacture of garter springs for a lack of better methods of assembly. The present invention through its automatic mechanical nature of operation eliminates the human element upon which the assembly of garter springs was heretofore dependent.

An object of the invention is to provide means for automatically assembling garter springs.

Another object of the invention is to provide a machine adapted to substantially simulate human motion in the assembly of garter springs.

Another object of the invention is to provide means for efficiently and economically assembling garter springs.

A further object of the invention is to provide means for automatically joining the opposite ends of an extension spring together having, respective male and female ends to thereby form a garter spring.

And yet a further object of the invention is the provision of a machine having parts operated in timed sequence necessary to the joining of the opposite ends of a closely bound coil of spring wire together to thus form a garter spring.

A still further object of the invention is to provide a machine for fastening the two ends of a closely wound extension coil spring together wherein the spring has a male end and a female end comprising twisting one end of the spring while holding the other end firm and then inserting the male end into the female end and simultaneously reversing the twist to thus provide for the threading together of the ends of the spring.

Other objects and advantages of the invention will appear from the following description taken in connection with the drawings, forming a part of the specification; and in which:

Figure 4 is an enlarged view of the spring clutch incorporated in the machine;

Figure 5 is a side view of Figure 4;

Figure 6 is a partial plan view of a closely wound coil spring, illustrating the male and female ends thereof; and Figure 7 is a partial plan view of the spring shown by Figure 6 in assembled form.

Figure 1:
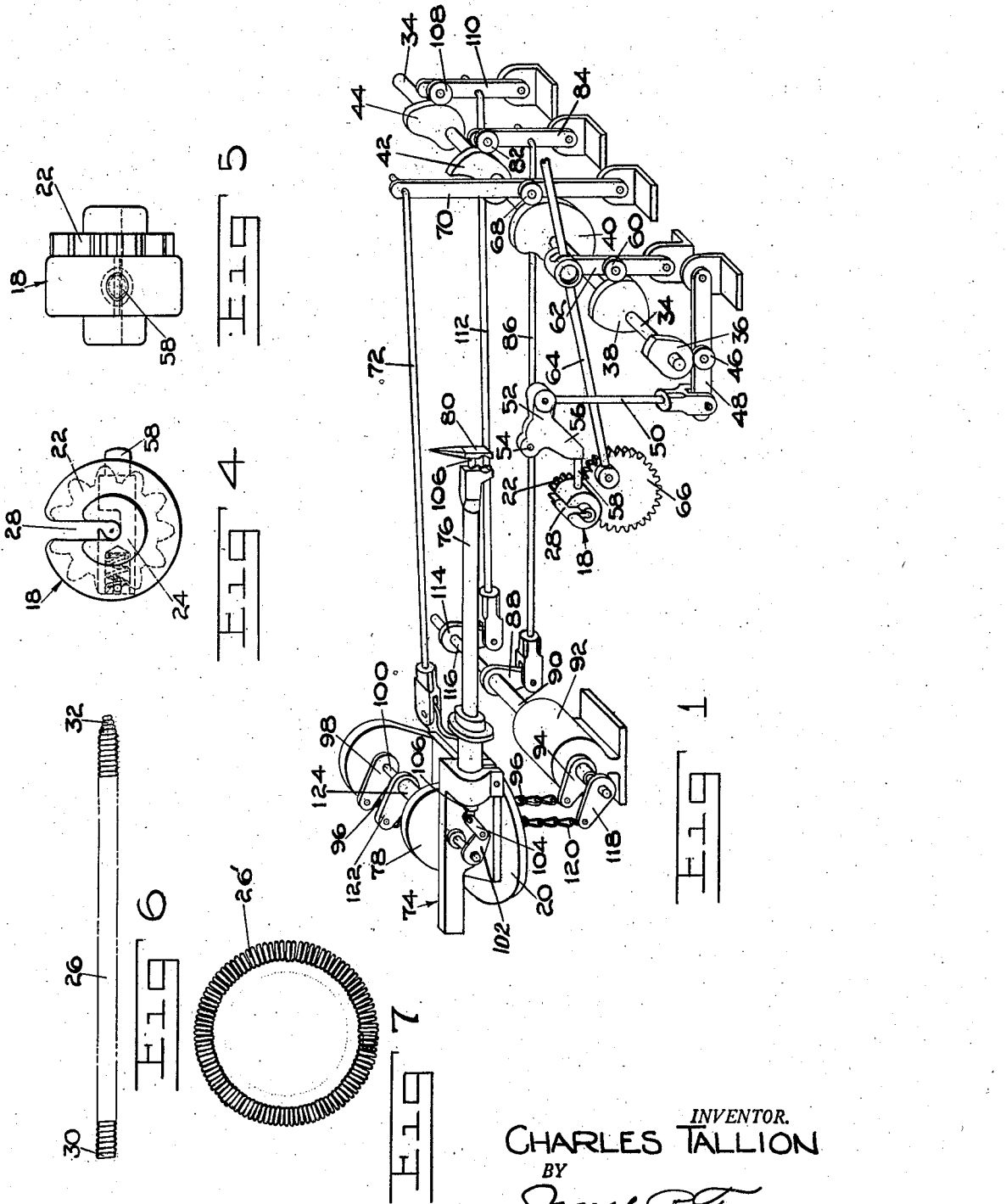
Figure 1 is a perspective view of the mechanism embodied in the garter spring assembly machine.
Figure 2:
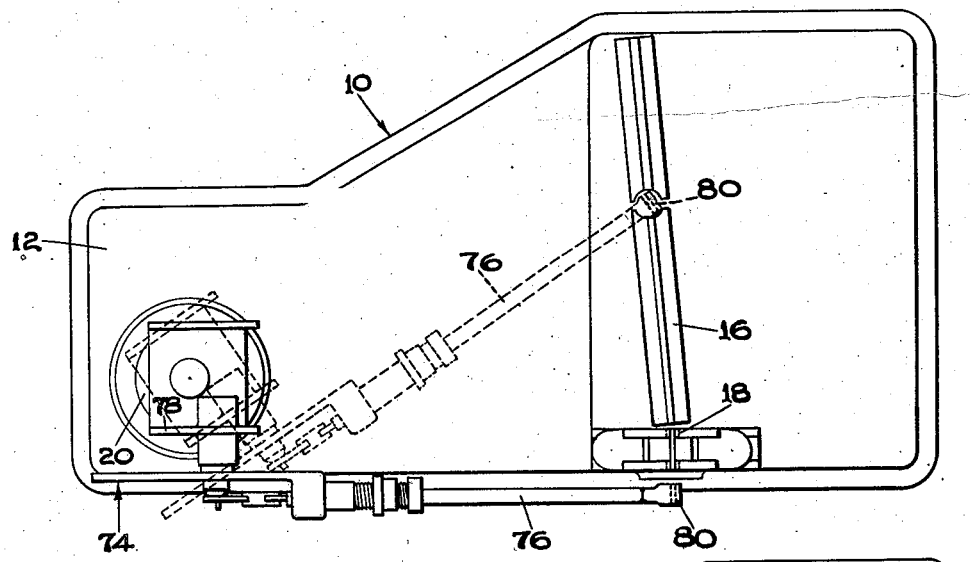
Figure 2 is a top plan view of the machine illustrating the horizontal sweep of the spring carrying arm.
Figure 3:
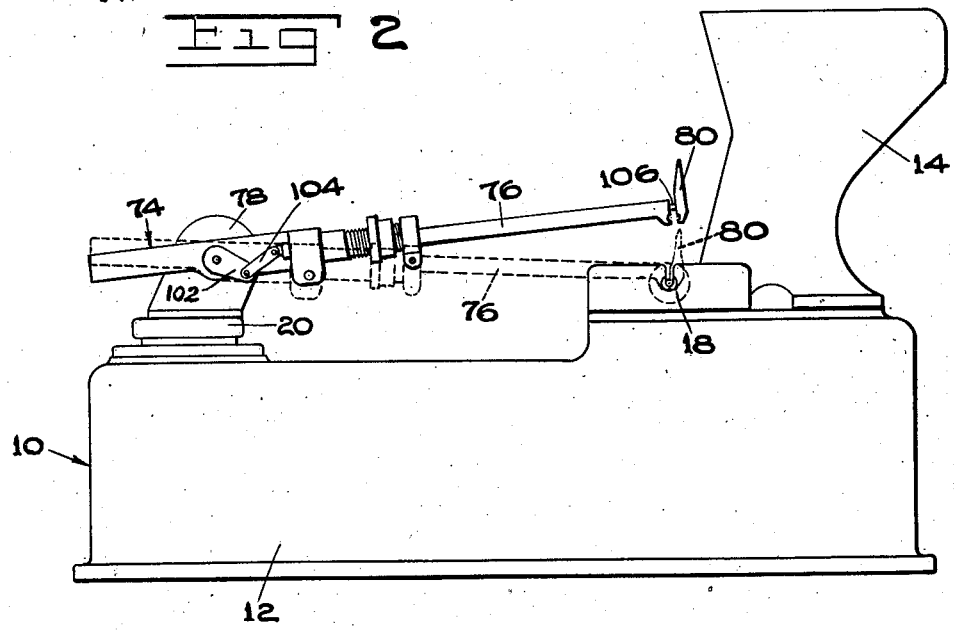
Figure 3 is a side view of Figure 2 illustrating the vertical movement of the arm.

In the assembly of "contractile" or "garter springs" wherein an original extension spring has a male end and a female end, one end is required to be twisted through a number of revolutions (depending upon the length of the spring and diameter of the spring wire) while the other end is held firmly. Then the ends are brought together, the female end being received by the other end and the twisted end turned back to approximately its normal alignment with the rest of the spring. During the reverse twisting of the end of the spring that was twisted, the male end threads into the female end of the spring and thus holds the spring together as a circular unit, this unit bearing the well known name "garter spring."

In the previous hand assembly method of garter springs many factors of inefficiency were present such as; necessity of instruction to individuals in the art of assembly, the period of time for the individual to attain maximum efficiency, and the further factor of human endurance and fatigue. The worth and magnitude of the instant invention is reflected from the fact that the assembly of garter springs by hand has been continuous since the first production of garter springs dating back about twenty years.

It was necessary in the construction of the present machine to translate into mechanics the method by which garter springs were assembled by hand. In the translation of motion from hand to machine assembly, it was necessary to provide feed means, positioning means, assembly control means, and power transmission means.

The feed mechanism consists of a hopper and delivery means incorporated therewith for delivering one spring at a time to the machine in accordance with the speed of the assembly mechanism, said feed mechanism adapted to be synchronized with the machine as a whole.

The positioning mechanism comprises means for locking the spring in proper position, means for holding one end firm until properly assembled and then releasing said end at the proper time to permit the assembled spring to be dropped free of the machine, means for raising and lowering the free end of the spring so that it may clear the balance of the spring when the free end is moved to assembly position, and means associated with the third means having lateral movement for carrying the free end of the spring to assembly position.

The assembly control means consists of a clutch having a spring pressed jaw incorporated therein. This clutch is connected to suitable actuating mechanism providing for limited rotation of the clutch, said spring pressed jaw operating to hold one end of the spring in the clutch so that the spring end is held firmly while the rotation of the clutch in one direction provides the spring with the proper twist and a reverse motion thereof assists in threading the respective ends of the spring together. The rotation of the clutch together with the spring pressed jaw for clamping the spring end therein are synchronized.

The power transmission means herein disclosed consists of a transmission shaft having varied contoured cams affixed thereto adapted to the respective means with which they are associated, said cams being so arranged with respect to one another as to afford proper synchronization of operation of the machine as a unit. Although cam timing control is herein employed, it will be apparent that any means capable of controlling the proper timing relationship of the respective parts of the machine will suffice; and accordingly, the cam control here used should not be taken as a limitation of structure.

Referring to the drawings for more specific details of the invention, 10 represents generally a garter spring assembly machine comprising a housing 12, a hopper 14 mounted on the housing, a slotted member 16 adapted to receive the extension coil springs from the hopper one at a time, a clutch mechanism 18 journaled in the housing adjacent one end of the slotted member, and a rotatable head 20 journaled in the housing.

The clutch mechanism 18 constituting an important part of the machine comprises a gear 22 integral therewith and a spring pressed jaw 24 mounted therein adapted to clamp one end of a coil spring 26 to be inserted in a radial slot 28 formed in the clutch.

The spring 26 as illustrated by Figure 6 is closely coiled and comprises a femal end 30 of uniform diameter as the coil of the spring and a male end 32 adapted to be received by the female end.

With particular reference to Figure 1, 34 represents a cam shaft adapted to be suitably journaled in housing 12 and having fixedly secured thereto cams 36, 38, 40, 42, and 44. Cam 36 is associated with spring pressed jaw means 24 through the medium of a roller 46 bearing on the cam 36, lever 48, link 50, and lever 52, said lever being pivoted about a fixed point 54 and having an arm 56 engaging one end 58 of jaw 24. The cam 38 is associated with clutch 18, to provide for the rotation thereof, through a roller 60 bearing on the cam 38, lever 62, link 64, gear 66, and gear 22.

The cam 40 is associated with head 20 through roller 68 bearing on cam 40, lever 70, and link 72 so as to impart oscillation to the head upon rotation of cam shaft 34. Mechanism 74 for picking up and moving the free end of the spring to that end of the spring held by the clutch 18 comprises an arm 76 journaled on an upright 78 affixed to head 20 and a cam operated jaw 80 mounted for movement within arm 76.

Cam 42 is associated with mechanism 74 for the purpose of opening and closing jaw 80 by way of roller 82 bearing on cam 42, lever 84, link 86, lever 88, shaft 90 journaled in bearing housing 92, lever 94, chain 96, lever 98, shaft 100, lever 102, link 104, and rod 106 connected with the movable portion of the jaw.

The cam 44 operates to rotate arm 76 about its pivot and thus provide for the lateral movement thereof and is coupled thereto through the medium of roller 108 bearing on cam 44, lever 110, link 112, lever 114, shaft 116 journaled within shaft 90, lever 118, chain 120, lever 122, and shaft 124 mounted for rotation upon shaft 98 and affixed to arm 76.

In a normal operation of the machine, with the cam shaft 34 rotating, upon delivery of a spring in its extended length from the hopper 14 and receipt by the slotted member 16, the spring is initially pushed into proper position in the slotted member, one end entering the slot 28 in the clutch 18. During the period of time within which the clutch slot 28 is completely opened the cam 36 is in a position whereby force is transmitted through lever 52 against the end 58 of jaw 24 so as to hold the jaw open. Simultaneously therewith the arm 76 is moved toward the end of the spring removed from the clutch 18.

Synchronously with the releasing of cam actuating pressure upon jaw 24 and the consequent clamping of the spring end within the clutch by the jaw 24, the arm 76 is moved to a position where the arm jaw 80 actuated by motion of cam 42 is opened to receive the other end of the spring. Immediately upon the jaw 80 closing and firmly gripping one end of the spring, the clutch 18 with the other end of the spring held therein is rotated through the movement of cam 38 and its associated members. It is to be observed that it is immaterial what end of the spring (30 or 32) is held by what jaw (24 or 80) thereby eliminating any necessity to feed the springs with a specific end to either of the jaws.

Simultaneousliy with the rotation of the clutch (providing for twisting of the end of the spring held thereby) the arm 76 is moved vertically through the medium of cam 44 and its associated members and at the same time is moved laterally by head 20 being rotated through the action of cam 40 and its associated members thereby providing movement of the spring end held by the arm jaw 80 across the other end of the spring without interference therewith. With the arm jaw 80 juxtaposed the clutch 18 and the ends of the spring in close proximity to one another such that the female end 30 of the spring receives the male end 32, the clutch rotation is reversed through the motion of cam 38 and its associated members, providing for the ends of the spring being threaded together. Upon completion of this operation, the cam 36 acts through its associated members to release the spring tension of jaw 24 from the clutch; and immediately thereafter as cam 44 provides for the upward lateral movement of arm 76, the cam 42 through the medium of its associated members releases the jaw 80 allowing the assembled spring 26', as shown by Figure 7, to fall free of the machine into a suitable receptacle (not shown). With this completion of one cycle of operation of the machine, the parts of the machine are in a position to resume further assembly upon continued rotation of the cam shaft.

While this invention has been described in connection with certain specific embodiments, the principle involved is susceptible of numerous other applications that will readily occur to persons skilled in the art. The invention is, therefore, limited only as indicated by the scope of the appended claims.

What I claim is:

1. A machine, for threading the ends of an extension spring together, comprising; means for twisting one end of the spring, means for holding the other end stationary, and means for positioning the ends in juxtaposed concentric alignment such that upon reverse twisting of the twisted end of the spring the ends are threaded together.

2. A machine, for threading the ends of a closely wound extension coil spring together, the spring having a female end and a male end, said machine comprising; means for clamping and holding one end of the spring stationary, means for clamping and twisting the other end of the spring through a predetermined number of revolutions, and means for bringing the ends of the spring face to face such that the female end of the spring is received by the male end of the spring whereby upon reverse twisting of the twisted end of the spring the ends will be threaded together .

3. A machine, for fastening the ends of an extension spring having a female end and a male end together, comprising; a spring delivery means, a rotatable clutch, a laterally and vertically movable arm cooperating with the clutch in predetermined timed relation having a jaw in the extremity thereof, and means providing for the synchronized operation of the delivery means, the clutch, and the arm.

4. A machine, for fastening the ends of an extension spring having a female end and a male end together, comprising; a delivery means, a rotatable clutch having a spring pressed jaw incorporated therein, a laterally and vertically movable arm cooperating with the clutch in predetermined time relation having a jaw in the extremity thereof, and means providing for the synchronized operation of the delivery means, the clutch, and the arm.

5. A machine, for fastening the ends of an extension spring having a female end and a male end together, comprising; a delivery means, a rotatable clutch, a movable arm having means incorporated therein cooperating with the rotatable clutch providing for the assembly of the spring, and means providing for the synchronized operation of the delivery means, the clutch, and the arm.

6. A machine, for threading the ends of a coil spring together, the spring having a female end and a male end, comprising; means for clamping and twisting one end of the spring, movable means having mechanism incorporated therein for clamping the other end of the spring, and means for synchronously actuating the first and second means.

7. A machine, for threading the ends of a spring together, said spring having a female end and a male end, comprising; rotatable means for clamping and twisting one end of the spring, laterally and vertically movable means having mechanism incorporated therein for clamping the other end of the spring, and means for synchronously actuating the first and second means.

8. In a machine for securing the ends of an extension spring together, the spring having a female end and a male end, a spring delivery means, a rotatable clutch having means incorporated therein for firmly holding one end of the spring, a laterally and vertically movable arm having means therein for firmly clamping the other end of the spring, and means providing for the synchronous actuation of the delivery means, rotation of the clutch, and movement of the arm.

9. In a machine for threading the ends of a coil spring together, the spring having an end of equal diameter as the coil and the other end of lesser diameter than the coil, a delivery hopper, means for clamping and twisting one end of the spring, a laterally and vertically movable means having mechanism incorporated therein for clamping and holding the other end of the spring from rotation during the movement of the first means, and means for imparting synchronous motion to the delivery hopper and first and second means.

10. A machine, for joining together the ends of a spring having a female end and a male end, comprising; a housing, a feed mechanism mounted on the housing, a clutch journaled in the housing having a spring pressed jaw incorporated therein, an arm pivoted on a member rotatable on the housing, said arm being laterally and vertically movable relative to the housing and having jaw means incorporated therein, and means for synchronously actuating the feed mechanism, rotating the clutch, actuating the jaw in the clutch, actuating the arm, and actuating the jaw in the arm.

11. A machine, for threading together the ends of a coil spring having a female end and a male end, comprising; a delivery hopper, a rotatable clutch having means incorporated therein for receiving one end of a spring delivered from the hopper and clamping it therein, a shiftable arm having means incorporated therein for grasping and holding the other end of the spring from rotation during rotation of the clutch and mechanism providing for synchronized actuation of the hopper, clutch, arm, and the means incorporated in the clutch and arms.

12. A machine, for assembling garter springs comprising means for clamping one end of the spring, means for twisting the other end of the spring, and means for bringing the ends of the spring together whereby upon reverse twisting of the twisted end of the spring the ends are threaded together.

13. A machine for joining together the ends of a coil spring comprising means for clamping one end of the spring, rotatable means for clamping the other end of the spring, and means for bringing the ends of the spring together, said rotatable means operating to twist one end of the spring during one phase of operation and untwisting the spring during another phase of operation so as to effectively join the ends of the spring when brought together.

CHARLES TALLION.